(12) United States Patent
Aoki et al.

(10) Patent No.: US 8,054,511 B2
(45) Date of Patent: Nov. 8, 2011

(54) IMAGE READING DEVICE (75) Inventors: Masashi Aoki, Hachioji (JP); Hideyuki Umeno, Sagamihara (JP)

(73) Assignee: Konica Minolta Business Technologies, Inc. (JP)

( * ) Notice: Subject to any disclaimer, the term of this patent is extended or adjusted under 35 U.S.C. 154(b) by 327 days.

(21) Appl. No.: 12/176,214

(22) Filed: Jul. 18, 2008

(65) Prior Publication Data

US 2009/0059319 A1    Mar. 5, 2009

(30) Foreign Application Priority Data

Aug. 30, 2007   (JP) ................................. 2007-223834

(51) Int. Cl.
*H04N 1/04* (2006.01)
*H04N 1/40* (2006.01)
(52) U.S. Cl. ......... 358/461; 358/496; 358/498; 358/408
(58) Field of Classification Search .................. 358/475, 358/461, 496, 498, 401, 486, 487, 474, 509, 358/505, 506, 408; 382/274; 399/379, 367, 399/374, 364
See application file for complete search history.

(56) References Cited

U.S. PATENT DOCUMENTS

| 7,411,704 B2* | 8/2008 | Wang ............................. 358/461 |
| 7,518,766 B2* | 4/2009 | Sheng ............................ 358/487 |
| 2003/0099002 A1* | 5/2003 | Yeh et al. ....................... 358/464 |
| 2005/0243382 A1* | 11/2005 | Wang ............................ 358/461 |
| 2008/0137107 A1* | 6/2008 | Futami .......................... 358/1.4 |
| 2009/0304425 A1* | 12/2009 | Aoki et al. .................... 399/367 |

FOREIGN PATENT DOCUMENTS

| JP | 05-014717 | 1/1993 |
| JP | 10-042111 | 2/1998 |
| JP | 2002-290685 | 10/2002 |
| JP | 2003-134301 | 5/2003 |

OTHER PUBLICATIONS

Notice of Reasons for Refusal for related Japanese patent application No. 2007-223834, mailed Sep. 6, 2011, 3 pp.
English Translation of Notice of Reasons for Refusal for related Japanse patent application No. 2007-223834, mailed Sep. 6, 2011, 4 pp.

* cited by examiner

*Primary Examiner* — Cheukfan Lee
(74) *Attorney, Agent, or Firm* — Squire, Sanders & Dempsey (US) LLP (57) ABSTRACT

An image reading device to read an image carried on a document, including: an image reading section to read an image carried on a document; a polygonal member, mounted to face the image reading section, and spaced from the image reading section at a predetermined distance, the polygonal member includes a document feeding flat surface which faces the image reading section when the document is fed thereon, a white flat surface, and a black flat surface; a light source to emit light rays onto the image carried on the document, and onto the polygonal member when the document is not fed; and a control section to control an amount of the light rays emitted from the light source; wherein the control section corrects an amount of light rays concerning the white color and the black color, based on the amount of the light rays read by the image reading section.

2 Claims, 6 Drawing Sheets

IMAGE READING DEVICE

This application is based on Japanese Patent Application No. JP2007-223,834 filed on Aug. 30, 2007, with the Japanese Patent Office, the entire content of which is hereby incorporated by reference.

TECHNICAL FIELD

The present invention relates to an image reading device.

BACKGROUND OF THE INVENTION

In the past, in image reading devices used for image forming apparatuses, such as copy machines, printers, and facsimile devices, original documents are sequentially fed from a document placing section by a document conveyance section.

When a xenon lamp is used as an illuminating lamp to illuminate an original document, the amount of light is initially decreased during continuous lighting due to its self generated heating, after which the amount of light emitted from the xenon lamp becomes stable. Said decrease of the amount of light can result in reading errors, such as non-reading of lines structuring a letter, so that continuous correction is necessary to keep stable light amount.

In the conventional art, a standard white plate is mounted adjacent to the image reading section, as a means for said correction. The amount of light, emitted from a light source and reflected by the standard white plate, is measured by an image pickup device, carrying an image reading function and a light amount measuring function, whereby said measured light amount is compared with a reflected light reference value which was previously obtained by the experiment. If any difference exists between them, the amount of light, measured by the image pickup device, is corrected to be equal to the standard reflected light amount by a control section, which uses a shading correction method.

Further, in the shading correction during image reading, various methods for mounting a correcting member, coated with a standard color for the standard white plate, are provided. Unexamined Japanese Patent Application Publication No. 5-14,717 discloses a rotatable roller whose outer circumferential surface has a portion coated with standard white color and a portion coated with standard black color, and said roller is mounted to face the image pickup device, whereby either portion can be selected.

Still further, Unexamined Japanese Patent Application Publication No. 2003-134,301 discloses a rotatable and white roller, serving as a guide member, which faces the image pickup device and is separated from the image pickup device at a predetermined distance. Said guide member includes a home position surface for the stand-by of the apparatus, an original document guide surface for reading the original document, and a shading correction surface for the shading correction.

However, in both Patent Applications, each member coated with the standard color is a roller. Since the roller has a curved surface to face the image pickup device, if an image reading line shifts slightly toward a document conveyance direction, the amount of light reflected by the standard white color after having been emitted from the light source, tends to vary, which tends to result in a less-accurate shading correction.

SUMMARY OF THE INVENTION

An image reading device as an aspect of the present invention is an image reading device to read an image carried on an original document being fed through a document conveyance route, wherein the image reading device includes:

an image reading section to read the image carried on the original document;

a polygonal member, mounted to face the image reading section and spaced from the image reading section at a predetermined distance, including an original document feeding flat surface which faces the image reading section when the original document is fed thereon, a white flat surface, and a black flat surface;

a light source section to emit light rays onto the image carried on the original document, and onto the polygonal member when the original document is not fed; and a control section to control an amount of the light rays emitted from the light source section, wherein the control section corrects an amount of light rays concerning the white color, based on the amount of the light rays read by the image reading section, in which the light rays are reflected by the white flat surface, after the light rays have been emitted from the light source section, and wherein the control section corrects an amount of light rays concerning the black color, based on the amount of the light rays read by the image reading section, in which the light rays are reflected by the black flat surface, after the light rays have been emitted from the light source section.

Based on the present invention, even when a reading line of the image pickup device is off-set from a predetermined standard, the standard color to be used for the correction can correctly conduct the shading correction.

BRIEF DESCRIPTION OF THE DRAWINGS

FIG. 3(*a*) is a cross-sectional view of the polygonal member.

FIG. 3(*b*) is a perspective view of the polygonal member.

DETAILED DESCRIPTION OF THE PREFERRED EMBODIMENTS

Embodiments of the present invention will be detailed below, while referring to the drawings, however, the present invention is not limited to said embodiments. Further, the explanation of the embodiments of the present invention shows a best mode, and said explanation does not limit the meaning of terms nor technical scopes of the present invention.

Figure 1:
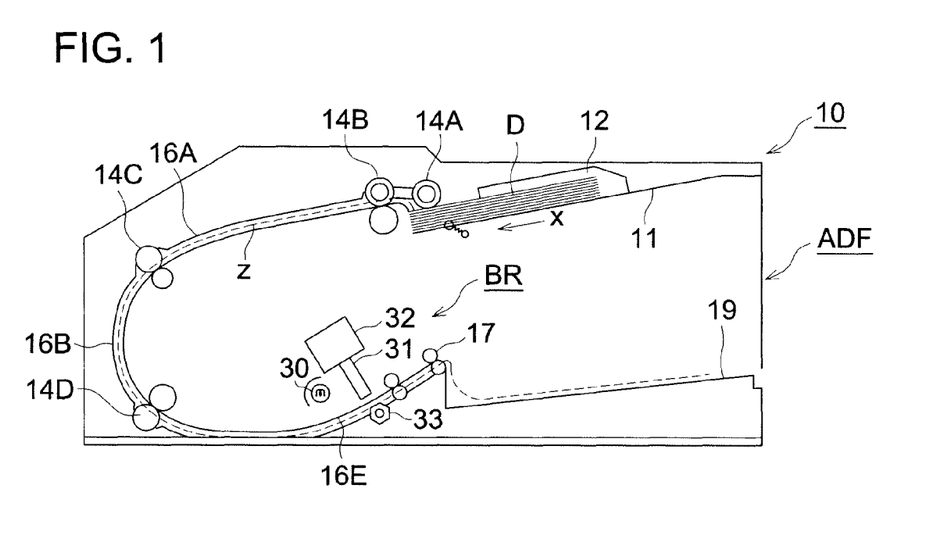
FIG. 1 is a schematic drawing of image reading device 10 relating to the embodiment of the present invention.

FIG. 1 is a schematic drawing of image reading device 10 relating to the embodiment of the present invention, wherein image reading device 10 is structured of automatic document feeding section ADF, and original document reading section BR.

In FIG. 1, numeral 11 represents an original document supplying plate on which the original documents to be copied are stacked, wherein original document supplying plate 11 includes width control member 12 which controls the width of each original document so that the width direction of each original document becomes perpendicular to an original document feeding direction. Feed-out roller 14A, driven by a driving source (which is not illustrated), feeds out the uppermost original document of the plural original documents stacked on original document supplying plate 11, in arrowed direction X. Paired separation and conveyance rollers 14B, mounted downstream of feed-out roller 14A with respect to the original document conveyance direction, are structured of a rotatable conveyance roller, and a stopping roller having a torque limiter.

Further, paired registration rollers 14C are mounted downstream of paired separation and conveyance rollers 14B, with respect to the original document conveyance direction. Said paired registration rollers 14C are structured of a rotatable registration roller driven by a driving source (which is not illustrated), and a driven roller, which together control a feed timing of original document D. Various stepping motors are used as the driving sources (which are not illustrated) of feed-out roller 14A, paired separation conveyance rollers 14B, and paired registration rollers 14C.

As shown by dashed line Z in FIG. 1, original document D is sequentially fed through guide plates 16A and 16B, and comes to be nipped by paired driven rollers 14D, after which original document D passes through original document reading section BR, and is subsequently ejected onto document ejection tray 19 by paired ejection rollers 17.

Figure 2:
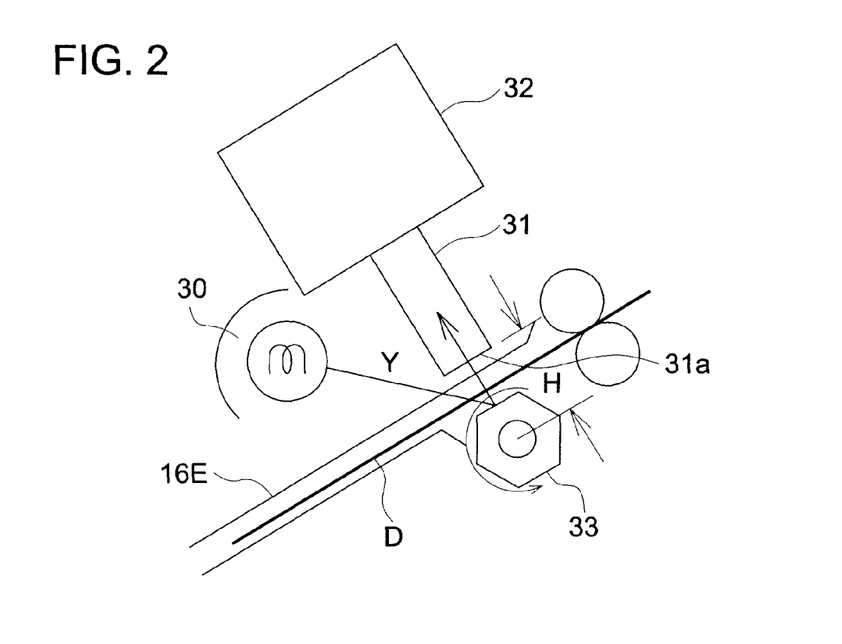
FIG. 2 details original document back surface reading section BR.

Next, original document reading section BR will be detailed while referring to FIG. 2.

In FIG. 2, original document reading section BR includes light source 30 which emits light rays onto original document D passing through guide plate 16E, and image reading member 31, having lens characteristics, to read light rays (which are shown by arrow Y) reflected from the illuminated images surface of original document D. Original document reading section BR further includes image pickup device 32 which is a CCD to convert the light rays read by image reading member 31 to electronic signals.

Polygonal member 33 is mounted at a position faced to and be separated from reading surface 31a of image reading member 31 by predetermined length H. Polygonal member 33 is rotated about its axis by a driving section which is not illustrated. Further, said polygonal member 33, being a regular hexagonal cylinder shape in the present embodiments, includes a original document feeding flat surface which faces reading surface 31a while original document D is fed, and white flat surface and black flat surface, both serving as standard surfaces. Opposing surfaces of the regular hexagonal cylinder work as the original document feeding flat surfaces. White flat surface and black flat surface, both serving as standard surfaces, are adjacent surfaces [see FIGS. 3(a) and 3(b)].

Predetermined distance H is a distance between the rotation center of polygonal member 33 and reading surface 31a, which is greater than the turning radius of polygonal member 33, so that polygonal member 33 does not touch reading surface 31a, while polygonal member 33 is rotated.

Image reading member 31 is formed of 2,400 optical fibers per inch, which are aligned linearly. Image reading member 31 carries the lens characteristics, in which the light rays are concentrated by optical fibers at a point 0.5-1.0 mm separated from reading surface 31a, which is an end face of each optical fiber.

Since polygonal member 33 is formed of a polyhedral structure, the standard white flat surface and the standard black flat surface, each includes flat surface portions. Accordingly, even though the reading line of image reading member 31 does not perfectly conform with the center axis in an axial direction of polygonal member 33, the amount of the light rays, reflected from the surface of the illuminated image of the original document, do not vary so that the amount of light rays entering image pickup device 32 can be correctly measured.

A xenon lamp, used for light source 30 of original document reading section BR, generally exhibits a temperature characteristic, so that the amount of light tends to decrease during continuous operation, due to the heat generated by said xenon lamp. In a characteristic curve shown in FIG. 4, during a few minutes after the start of lighting, the amount of light rays emitted from the xenon lamp decreases a few %, after which the amount of light rays becomes stable.

Figure 4:
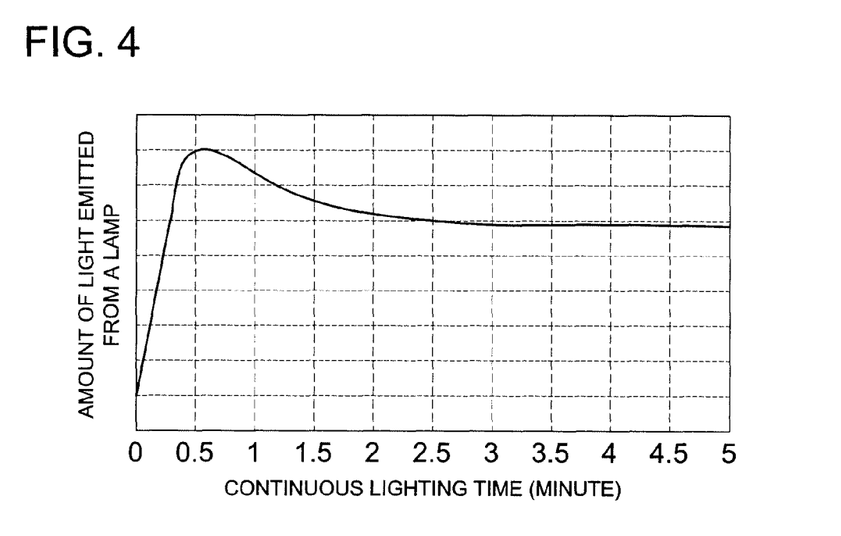
FIG. 4 shows that the amount of the light rays emitted from an illumination lamp, serving as the light source, varies with the working time.

In order to correct the decrease of the amount of light rays emitted from light source 30, the data which is previously obtained by via experimentation, is compared with the amount of reflected light rays which is obtained when the light rays are emitted onto the standard white flat surface, whereby the rate of change of the amount of light rays can be calculated, and the correction (which is referred to as "shading correction") is conducted so that the amount of light rays emitted from light source 30 becomes stable.

Figure 3:
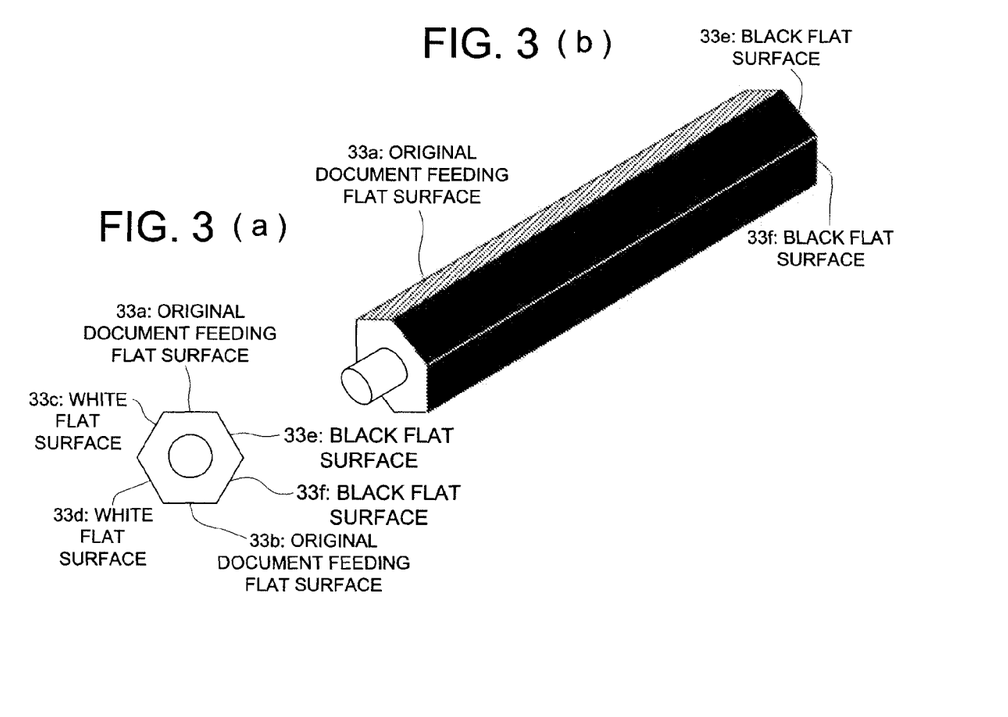

As shown in FIG. 2 and FIGS. 3(a) and 3(b), polygonal member 33, being a hexagonal cylinder, is employed in the present invention. Further, opposing surfaces of the regular hexagonal cylinder are designed as the original document feeding flat surfaces. Still further, white flat surface and black flat surface, both serving as standard surfaces, are arranged to be adjacent surfaces.

The reason for the black flat surface being employed is that since light source 30 emits varying light rays as described above, if the original document includes relatively large gray areas, by conducting correction with respect to the black color as the same way as the white color, this invention can prevent erroneous decision in which the original document includes partial black portions.

When original document reading section BR reads the images of original document D, original document feeding flat surface 33a or original document feeding flat surface 33b is positioned to face reading surface 31a. If control section 200 (see FIG. 5) determines to conduct the shading correction, polygonal member 33 is driven by a driving member (which is not illustrated) which is structured of a driving motor and appropriate gears, before the original document reading operation is started, so that standard white flat surface 33c or 33d is positioned to face reading surface 31a.

Further, if control section 200 determines to conduct the correction of black density, black flat surface 33e or 33f is positioned to face reading surface 31a.

The reason why two white flat surfaces and two black flat surfaces are provided is that even when either one of the two flat surfaces is covered with dust, the other one can be used so that the correction accuracy increases. Still further, since the same colored flat surfaces are mounted adjacent to each other, the rotating operation for conducting the shading correction is controlled to be less time, which results in a minimized time to conduct the shading correction.

Figure 5:
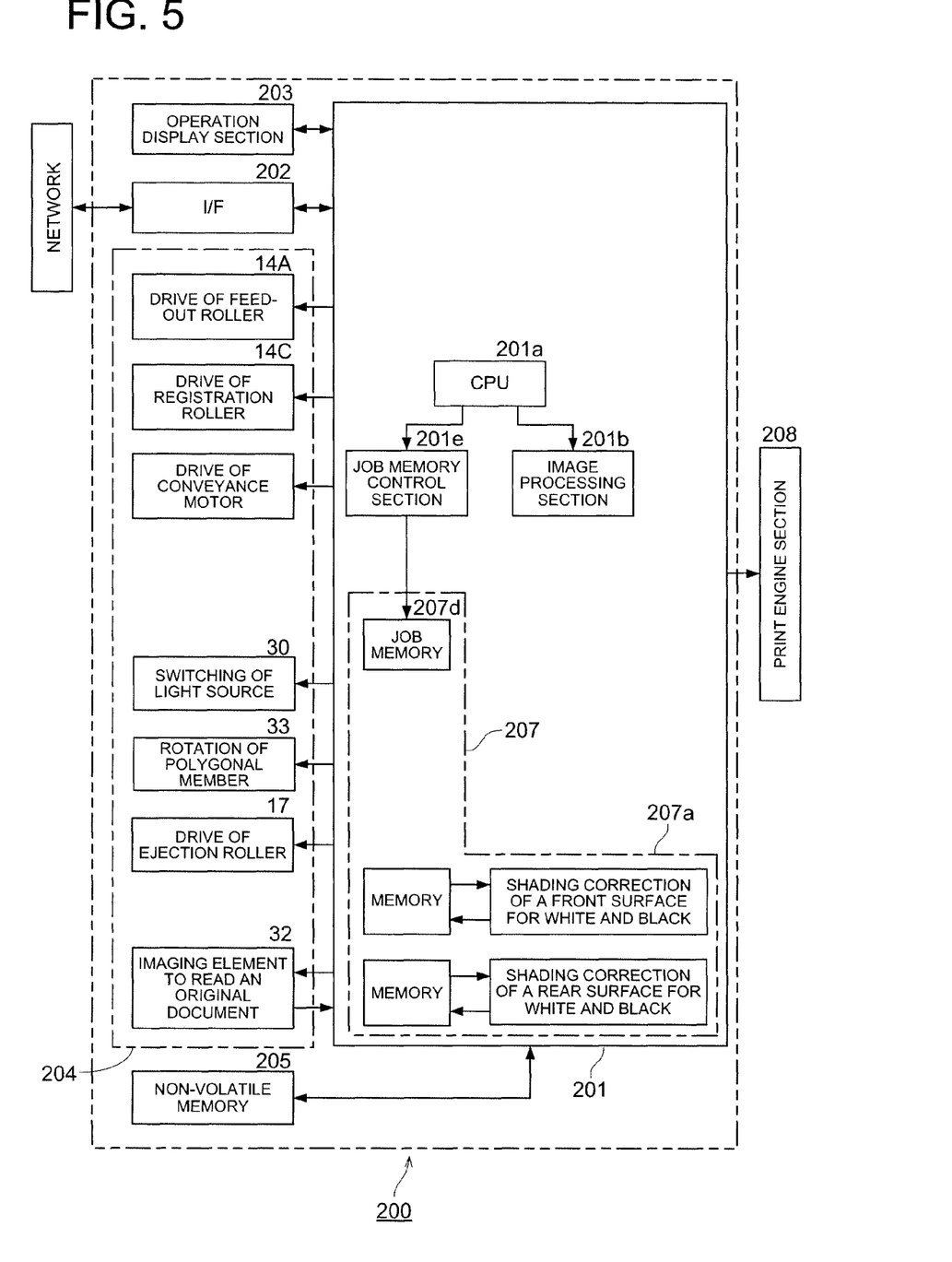
FIG. 5 is a block diagram of a control system relating to the present embodiment.

FIG. 5 is a block diagram of a control system relating to the present embodiment.

Control section 200, to control image reading device 10, is a job control means to conduct a job control which will be detailed below. Numeral 201 represents a central control section to control each section.

Numeral 202 represents interface I/F serving as a communication means to conduct communication via a network. Numeral 203 represents an operation display section, via which various operational commands for operating image reading device 10 are inputted, and which conducts the various displays. Numeral 204 represents an image forming section which forms image data by reading the image of original document C. Numeral 205 represents a non-volatile memory serving as a data table to store the various data and setting values. Numeral 207 represents a memory, such as a semiconductor memory or a hard disk, which forwards the image data for the image formation to the relating sections, or temporarily stores the various data.

Central control section 201 gathers the light amount distribution data which shows the different amounts of light amount with respect to the main scanning direction, included in the image data which is obtained by reading the standard white flat surface, after which central control section 201 calculates shading correction data to flatten the light amount distribution, based on said light amount distribution data.

Image data forming section 204 drives feed-out roller 14A to feed original document D, and drives paired registration rollers 14C to control conveyance synchronization of original document D. Further, image data forming section 204 drives to rotate polygonal members 33, and drives paired ejection rollers 17 to eject original document D onto document ejection tray 19. Still further, image data forming section 204 controls image pickup device 32 to read original document D. Each of these sections is operated by central control section 201.

Non-volatile memory 205 serves as a memory means to memorize the shading correction data (which includes the rate of change of the amount of light rays, being previously calculated) which varies during continuous lighting of light source 30.

Central control section 201 is structured of: CPU 201a which controls the image reading operation, the image formation, and other total operations; image processing section 201b which conducts image processing; and job memory control section 201e which controls job memory data of each operator and job memory data of common use.

Image processing section 201b, in conjunction with CPU 201a, additionally structures the shading correction means which conducts the shading correction of the image data using plural shading correction data based on continuous lighting duration of the light source during the image reading operation.

Memory 207 is structured of image memory 207a which forwards the image data for processing the image onto relating sections, and job memory 207d which stores the job memory data therein. The job memory represents a memory section to register the ordered image forming jobs.

Control section 200, connected to this net work, represents control sections of various integrated apparatuses, such as a facsimile device and a compound digital apparatus, as well as the control section of the copy machine. Print engine 208 is driven by an electro-photographic method using a photo conductor and laser beams, a method using an LED print head, or an inkjet method.

Figure 6:
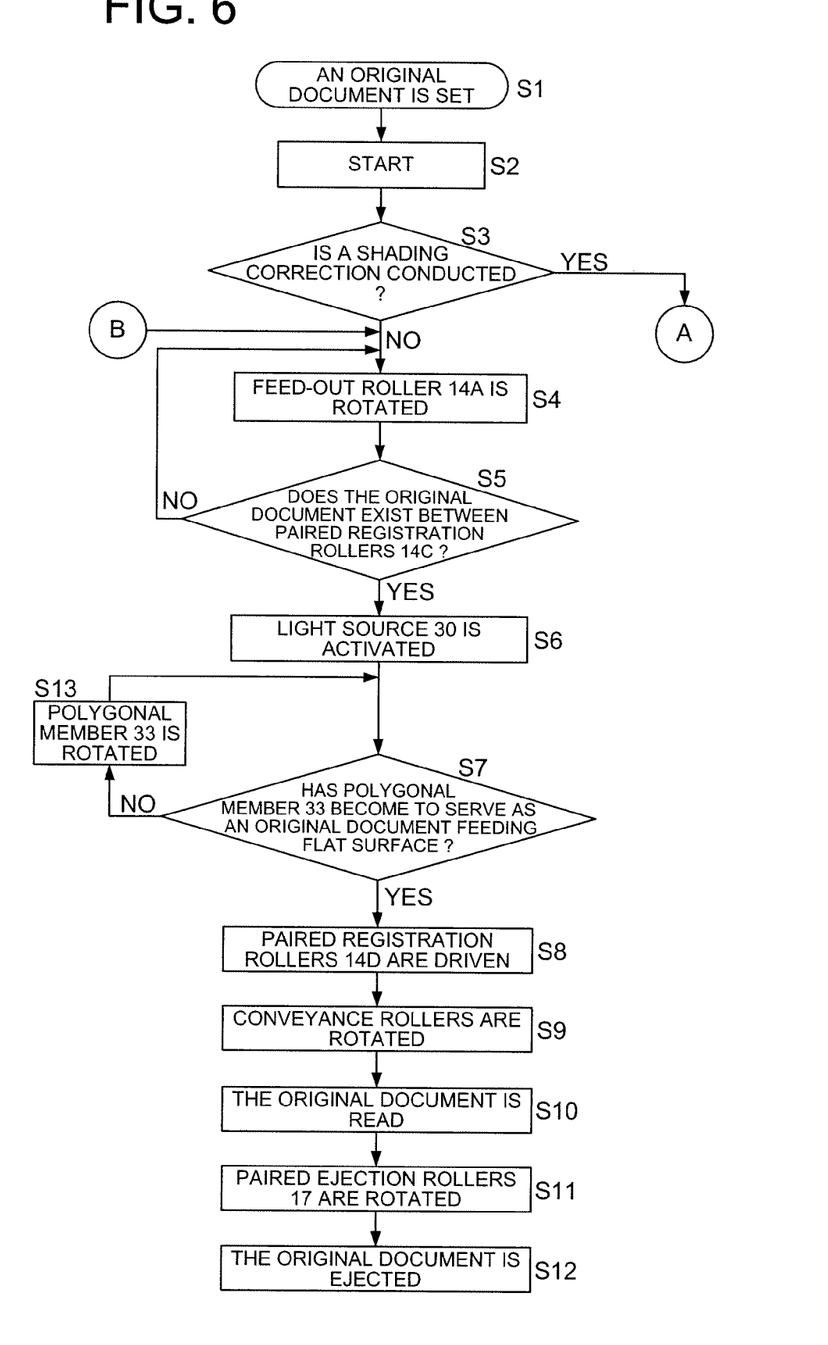
FIG. 6 is a flow chart relating to the present embodiment.
Figure 7:
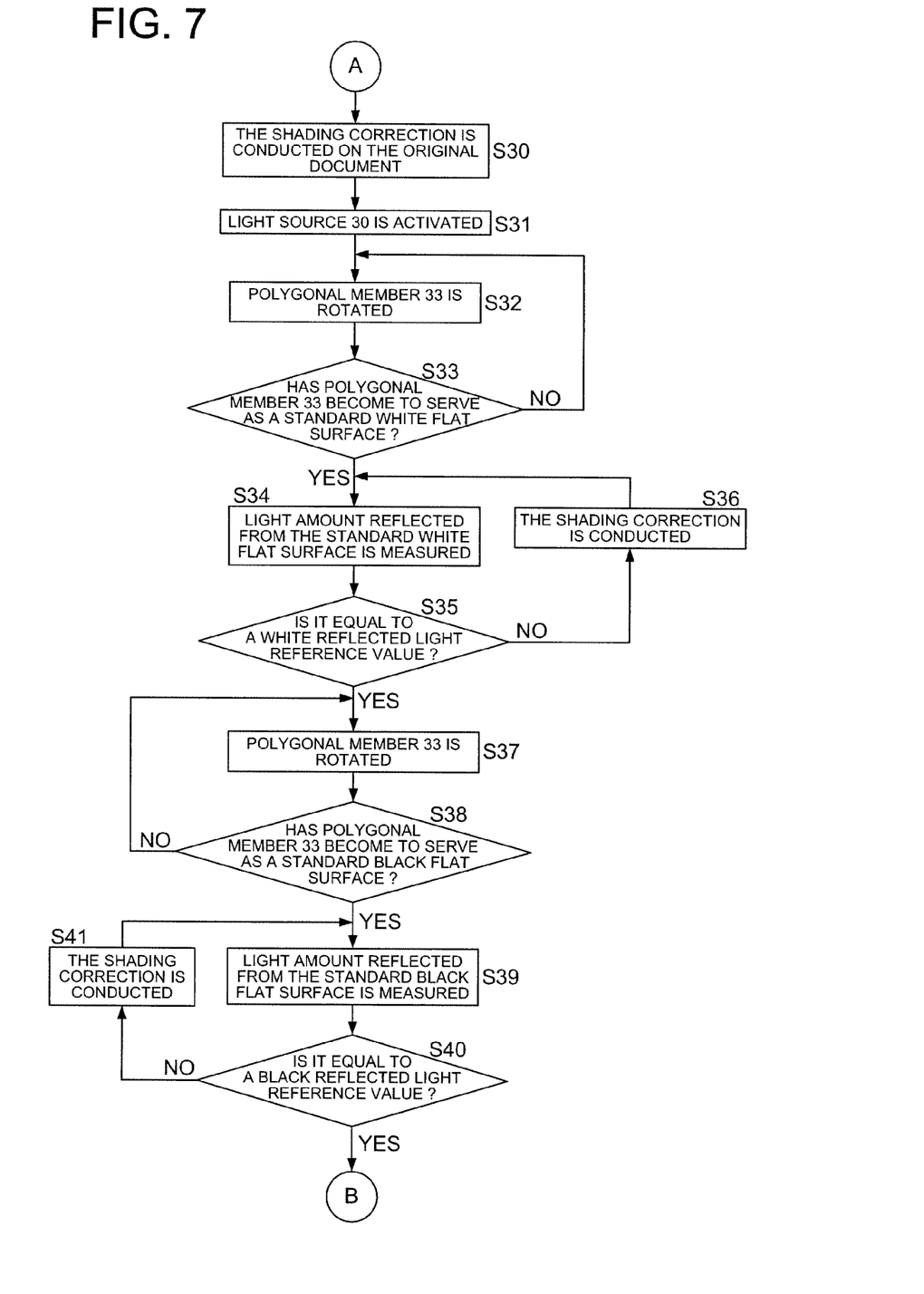
FIG. 7 details a shading correction mode for the original document.

The operation conducted by control section 200 of image reading device 10 relating to the present embodiment will be detailed below, while referring to the flow charts shown in FIGS. 6 and 7. Symbols A and B in FIG. 6 are connected to symbols A and B in FIG. 7, respectively. FIG. 7 shows the shading correction mode.

In FIG. 6, the operator sets original document D on tray 11 (which is step S1), and presses an operation button to start an original document reading operation (step S2). Control section 200 checks whether to conduct the shading correction or not (step S3). This determination is conducted by a software program, after a predetermined setting number of original documents D has been counted, or when image reading device 10 is activated. If the shading operation is not necessary (No in step S3), feed-out roller 14A is rotated to feed out original document D (step S4). An image pick-up device (which is not illustrated) to detect original document D checks whether original document D has arrived at paired registration rollers 14C or not, so that the feed synchronization is controlled (step S5), whereby if original document D has arrived at paired registration rollers 14 (Yes in step S5), light source 30, mounted within original document reading section 30, is activated (step S6). If original document D has not arrived at paired registration rollers 14 in step S5 (No in step S5), the operation flow goes back to step S4 in FIG. 6. After light source 30 is activated in step S6, a surface to face reading surface 31a is checked if it is an original document feeding flat surface or not (step S7). This checking operation is conducted by the following procedure. That is, during the counting operation of the number of steps for the stepping motor which serves as a driving motor to rotate polygonal member 33, a target number of steps to become the original document feeding flat surface is counted after an appropriate standard number of steps has been counted. This is only a simplification, and detailed explanation is omitted.

If step S7 results in "Yes", paired registration rollers 14C and the various rollers are driven (step S8), so that the reading operation of original document D is started (step S10). After that, original document D is ejected by the rotation of paired ejection rollers (step S12).

If step S7 results in "No", polygonal member 33 is further rotated (step S13) to become "Yes" in step S7.

If the shading correction is necessary in S3 (Yes in S3), the operation flow enters the shading correction mode shown in FIG. 7 (step S30). That is, light source 30 is activated (step S31), and polygonal member 33 is rotated (step S32) so that a surface to face reading surface 31a is checked whether it is a standard white flat surface of polygonal member 33 (step S33). If S33 results in "No", the operation flow returns to step S32.

If step S3 results in "Yes", the amount of light rays reflected from said standard white flat surface is measured (step S34), whereby said measured amount is checked whether it is equal to the previously set white reflected light reference value or not (step S35). If it is "No" in step S35, after the shading correction is conducted (step S36), the amount of light reflected from the standard white flat surface is again measured in step S34. If step S35 results in "Yes", polygonal member 33 is rotated (step S37) so that a surface to face reading surface 31a is checked whether it is a standard black flat surface of polygonal member 33 or not (step S38). If step S38 results in "No", the operation flow returns to step S37. If step S38 results in "Yes", the amount of light rays reflected from the standard black flat surface is measured (step S39), whereby said measured amount is checked whether it is equal to the previously set black reflected light reference value or not (step S40). If it is "No" in step S40, after the shading correction is conducted (step S41), the amount of light reflected from the standard black flat surface is again measured in step S39. If step S40 results in "Yes", the operation flow returns to step S4 (see symbol B) in FIG. 6.

According to the present embodiment described above, original document reading section BR is better adapted to read a reverse surface of the original document carrying images on both surfaces. If a polygonal member is provided to face a slit glass for reading the reverse surface of the original document, a shading correction at a reading section of the front surface can be conducted for reading images carried on the front surface.

Figure 8:
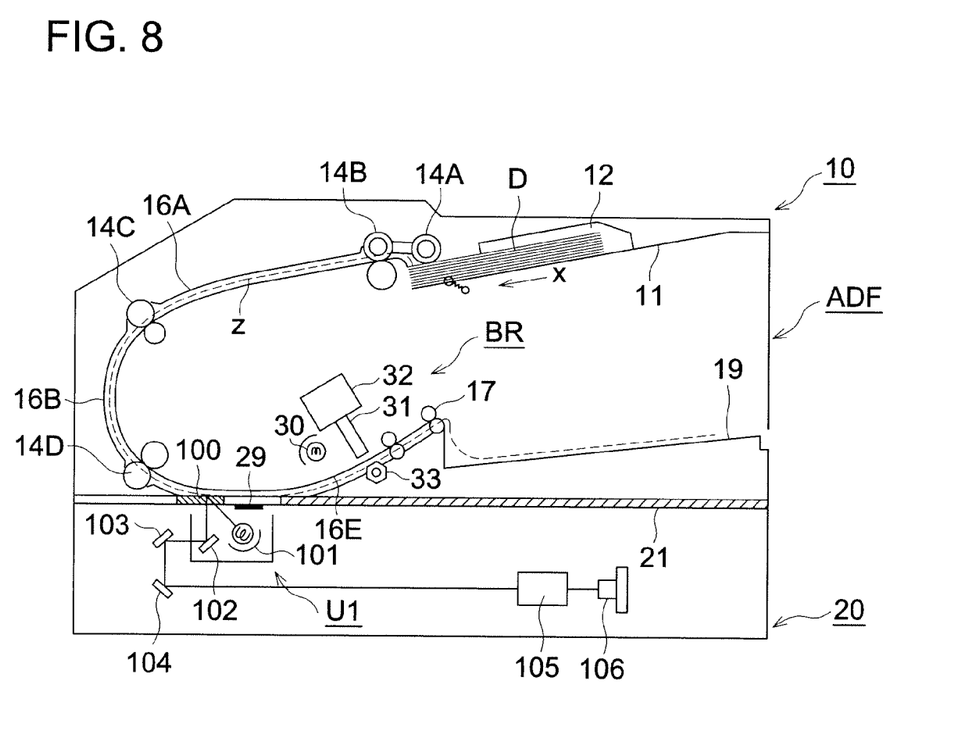
FIG. 8 shows another embodiment, including an original document front surface reading section.

Further, employing an optical system structured of a lens and mirrors, the shading correction using the standard white flat surface can be conducted, which is shown in FIG. 8.

In FIG. 8, numeral 20 represents a reading section of a front surface of an original document. Original document D, ejected by paired registration rollers 14D, is fed on slit glass 100 and is read by original document reading section 20. Said original document reading section 20 will be detailed below.

Original document reading section 20 includes slit glass 100, being a transparent member, and first light source 101, being a xenon lamp or a fluorescent lamp, which illuminates images carried on original document D fed on slit glass 100, when the image is being read. Optical unit U1 is structured of first light source 101 and first mirror 102, being integrated with each other. Light rays L are emitted from first light source 101 and radiated onto the front surface of original document D, light rays L reflected by the front surface enter slit glass 100. After said light rays L are collected by lens 105 through first mirror 102, second mirror 103 and third mirror 104, light rays L enter first image pickup device 106. Said first image pickup device 106 is a photoelectric element, structured of a line-type CCD.

Standard white flat surface 29, exhibiting a uniform white density, is mounted under platen glass 21. After optical unit U1 is moved to a predetermined position, the light rays are emitted onto standard white flat surface 29, and the amount of reflected light rays is measured by first image pickup device 106.

Based on the measured light rays, distribution data of the light rays is obtained, which shows the difference (being the distribution of the light rays) of the amount of light rays in the main scanning direction, whereby shading correction data to correct said obtained distribution data is generated.

What is claimed is:

1. An image reading device to read an image carried on an original document being fed through a document conveyance route, comprising:

an image reading section to read an image carried on an original document;

a polygonal member, mounted to face the image reading section and spaced from the image reading section at a predetermined distance, including
   an original document feeding flat surface which faces the image reading section when the original document is fed thereon,
   a white flat surface, and
   a black flat surface;

a light source section to emit light rays onto the image carried on the original document, and onto the polygonal member when the original document is not fed;

a control section to control an amount of the light rays emitted from the light source section; and a driving section to rotate the polygonal member, wherein the control section corrects the amount of the light rays concerning the white color, based on the amount of the light rays read by the image reading section, in which the light rays are reflected by the white flat surface, after the light rays have been emitted from the light source section, wherein the control section corrects an amount of the light rays concerning the black color, based on the amount of the light rays read by the image reading section, in which the light rays are reflected by the black flat surface, after the light rays have been emitted from the light source section, and wherein the original document feeding flat surface is adjacent to the white flat surface and the black flat surface.

2. The image reading device of claim 1, wherein the polygonal member includes:
   two original document feeding flat surfaces;
   two white flat surfaces; and
   two black flat surfaces,
   wherein the two original document feeding flat surfaces are mounted at opposite sides, the two white flat surfaces are mounted adjacent to each other, and the two black flat surfaces are mounted adjacent to each other.

* * * * *